United States Patent [19]
de Graaf et al.

[11] Patent Number: 5,188,863
[45] Date of Patent: Feb. 23, 1993

[54] DIRECT EFFECT MASTER/STAMPER FOR OPTICAL RECORDING

[75] Inventors: Martinus J. M. de Graaf, Veldhoven, Netherlands; Michael G. Fickes, Kennett Square, Pa.; George H. Johnson, Wilmington; Howard E. Simmons, III, Newark, both of Del.

[73] Assignee: E. I. Du Pont de Nemours and Company, Wilmington, Del.

[21] Appl. No.: 628,889

[22] Filed: Dec. 18, 1990

Related U.S. Application Data

[63] Continuation-in-part of Ser. No. 375,099, Jun. 30, 1989, abandoned.

[51] Int. Cl.⁵ .................... B05D 3/14; B05D 5/06
[52] U.S. Cl. .................. 427/512; 156/307.7; 204/192.1; 427/162; 427/164; 427/240; 427/250; 427/264; 427/271; 427/358; 427/165; 427/587
[58] Field of Search ............... 427/162, 165, 271, 164, 427/240, 53.1, 250, 264, 358, 50; 204/192.1; 156/307.7; 430/270, 346, 495, 320, 321

[56] References Cited

U.S. PATENT DOCUMENTS

| | | | |
|---|---|---|---|
| 4,363,844 | 12/1982 | Lewis et al. | 427/44 |
| 4,382,103 | 5/1983 | McQuaid | 427/164 |
| 4,565,772 | 1/1986 | Takeoda et al. | 430/320 |
| 4,912,696 | 3/1990 | Feyrer et al. | 369/100 |
| 4,965,118 | 10/1990 | Kodera et al. | 156/233 |

Primary Examiner—Janyce Bell
Attorney, Agent, or Firm—Norman N. Spain

[57] ABSTRACT

A method for making optical recording media in which the optically readable information is embossed therein by means of an information master recording which is directly usable as a stamper.

24 Claims, 3 Drawing Sheets

DIRECT EFFECT MASTER/STAMPER FOR OPTICAL RECORDING

This application is a continuation-in-part of application Ser. No. 07/375,099 filed Jun. 30, 1989 and is now abandoned.

FIELD OF THE INVENTION

The invention is directed to the manufacture of information-carrying media for use in optical readout systems employing a laser beam. More particularly, the invention is directed to the manufacture of disc media carrying coded information which is convertible from reflected optical signals to electrical signals for such varied uses as sound recordings, audio/visual recording or computer information data storage and retrieval systems.

BACKGROUND OF THE INVENTION

Conventional manufacturing of compact and video disks involves a number of discrete, time-intensive process steps. Laser beam recording of a prepared (spin-coated, soft baked) photoresist master is followed by "wet" solvent development of the pit information and "silvering" to allow optical inspection of the finished master. A nickel shell is grown directly on the finished master by electroplating or wet (electroless) nickeling. After separation from the master and cleaning, this nickel shell is matrixed to produce a family of nickel stampers that are used in an injection molding process to replicate polycarbonate compact disks. Vacuum deposition (sputtering or evaporation) of an aluminum reflector layer or electroless deposition of a silver reflector layer, lacquering with a protective varnish and label printing finish the process.

The conventional process for producing embossed optical media described above involves so many manipulative process steps that, even when individual step yields are quite high, the overall yield of satisfactory media (i.e., no errors, blemishes and other defects) is low because of the high number of steps in the total process sequence.

For this reason, there is a substantial need to reduce the number of manufacturing steps and the turn-around time needed to produce finished media. A particularly desirable way of accepting this would be to avoid the number of steps needed to make stampers from the photoresist master.

PRIOR ART

U.S. Pat. Nos. 4,363,844 and 4,519,065 describe a closely related process for making video discs and similar devices. The starting composition is not molten plastic, but can be an element comprising a very thin embossable radiation-reflective layer overlying an embossable, heat-softenable layer which can be simply thermoplastic or can also be radiation-curable. Optionally, the heat-softenable composition can be coated on a substrate. The heat-softenable composition is chosen so that its maximum loss modulus is between 30° and 180° C., which allows embossing at 50°-200° C. at pressures of 5-100 kg/cm$^2$. These conditions are similar to those used in compression or injection molding techniques for making video and compact discs. Impressing the stamper information into the heat-softenable layer can be done with a platen or roll embosser. Radiation curing helps retain the desired relief shape by crosslinking. Discs are provided with the reflective layer before they are impressed with the information carrying relief pattern.

A significant disadvantage with both of the high pressure, high temperature relief-forming methods described above is the potential for image distortion and internal stresses in the discs produced.

As described in the *Journal of Radiation Curing*, a photopolymerization method was developed to help overcome these limitations (A. J. M. van den Broek et al., *Journal of Radiation Curing*, 11, 2-9, 1984). In this method which is frequently referred to as the "2P" process, a measured amount of liquid, low viscosity photopolymerizable acrylate monomer or mixture of acrylate monomers is applied at room temperature to the information-carrying master, spread out uniformly by applying to the liquid layer a flexible film of transparent plastic which is suitable as a permanent disc substrate. After the liquid fully covers the mold in the proper thickness, the liquid fully covers the mold in the proper thickness, the liquid composition is photohardened and adhered to the substrate by exposure to ultraviolet radiation through the substrate.

Because the method uses a low viscosity liquid composition, high temperature and pressure are not needed to make the material accurately conform to the stamper. Further, the stampers used need not be as mechanically strong as in compression molding methods which allows the use of lower cost plastic stampers.

U.S. Pat. No. 4,482,511 discloses a similar approach using radiation-sensitive liquid compositions comprised of monomers, oligomers or mixtures thereof. Pressures of less than 1 kg/cm$^2$ are needed and high fidelity glass master originals can be used. Means for applying a thin fluoropolymer release layer to the stamper surface is also disclosed.

In U.S. Pat. No. 4,510,593, polymerizable mixtures of mono- and polyunsaturated monomers also containing soluble film-forming polymer binders are described which are applied to a substrate then contacted with a flexible stamper by means of a pressure roll. The presence of the binder is stated to improve the properties of the information-carrying layer. In U.S. Pat. No. 4,430,363, a screen printing method for applying similar radiation sensitive mixtures to the substrate is described. In both of these patents, curing is achieved by exposure through an actinic radiation-transparent stamper.

In U.S. Pat. No. 4,582,885, a fluid, polymerizable oligomer composition containing "hard" and "soft" segments that can be varied to control end-use physical properties is used to prepare a variety of information-carrying articles, including optical discs.

In U.S. Pat. No. 4,296,158, mixtures of polyacrylate monomers and heterocyclic group-containing oligomers with terminal unsaturation are spread over a stamper and simultaneously covered with a polymeric film by means of a pressure roll. The film becomes the disc substrate.

In U.S. Pat. No. 4,354,988 a process is described that produces optical discs by combining the steps of spreading photocurable resin on a stamper, covering with substrate film, curing, punching a center hole and trimming, all in a continuous sequence.

While the liquid compositions described in the above patents and technical article may be fluid enough to conform to the information-carrying stamper relief pattern at room temperature under application pressures much lower than required for compression molding, they nevertheless have certain inherently practical limitations: (1) fluid compositions require a precision mold to contain the liquid; and (2) careful control of the amount of liquid charged during each cycle is required to maintain uniformity of thickness and other critical disc dimensions.

SUMMARY OF THE INVENTION

The invention is directed primarily to a method for making an optical recording medium having a basic structure of (a) an optically transparent, dimensionally stable substrate, (b) a solid polymeric layer having optically readable information embossed therein, and (c) a light-reflective layer overlying the information layer comprising the steps of:

A. Forming an information master recording which is directly usable as a stamper (master/stamper) by writing a relief track of optically readable information in the form of a series of solid bumps by action of a laser beam upon a recording medium comprising (1) a dimensionally stable planar substrate having adhered to a surface thereof, (2) an active recording layer to the surface of the substrate, the expansion layer having a low thermal conductivity, high TCE (thermal coefficient of expansion) and $T_g$ below 50° C., and having colorant dispersed therein; and (b) bonded to the expansion layer an upper retention layer comprising a solid non-elastic polymer having low thermal conductivity, low TCE and $T_g$ above 70° C.;

B. Forming a hardenable soft polymeric layer on one side of a dimensionally stable planar optically transparent substrate, the layer having a creep viscosity of at least 20 megapoise and a thickness of at least 0.1 microns;

C. Optionally forming a reflective layer on the exposed surface of the hardenable polymeric layer prior to embossing;

D. Embossing the hardenable polymeric layer with an image of the relief information track by applying the bump-containing surface of the master/stamper to the hardenable layer under pressure;

E. Hardening the hardenable polymeric layer;

F. Separating the master/stamper from the embossed polymeric layer; and

G. Forming a reflective layer on the embossed surface of the hardened polymeric layer if none was formed prior to embossing step D.

BRIEF DESCRIPTION OF THE DRAWING

The drawing consists of eight figures, of which

Figure 1:
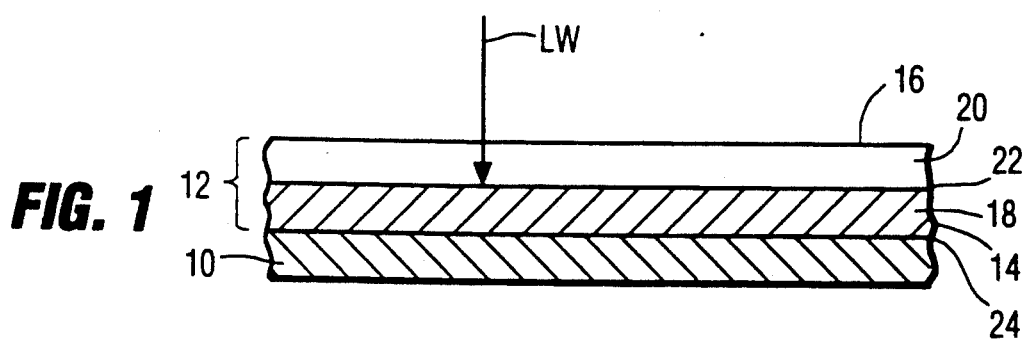
FIG. 1 is a schematic representation of the operation of a master/stamper in the write mode.

The above-described invention utilizes a direct effect master/stamper which greatly simplifies the manufacturing process for compact and video disks. The effects (bumps in this case) or mark information are formed and inspected directly during the master recording. There is no wet development as with a photoresist-based master. By direct effect stamper, we mean that the master is used directly as a stamper in a replication process. There is no need for family matrixing to produce nickel stampers for the injection molding replication process. The bump information on the direct effect master/stamper is used directly in a low temperature and pressure embossing process to impress information on the replicas.

DETAILED DESCRIPTION OF THE INVENTION

A. Formation of the Master/Stamper

Particularly useful in the process of the invention are erasable bump-forming media such as the bilayer structure disclosed in Feyrer et al. U.S. Pat. Nos. 4,719,615, 4,852,075 and 4,912,696. Such erasable bump-forming media permit correction or changes while surprisingly maintaining their integrity as a stamper die for making replicas by embossing techniques. The process of this invention will be more fully described within the context of such erasable bump-forming media.

1. Substrate

The substrate materials which can be used in the master/stamper are those which are dimensionally stable within the assembled structure. The substrate material preferably has a low thermal coefficient of expansion (TCE). The substrate can be either opaque or transparent and can be made of virtually any of the conventional substrate material such as aluminum, glass, quartz, copper, brass, steel, magnesium, cadmium, silver, gold, polyester film, poly(tetrafluoroethylene) film, polyamide films, polycarbonates, and other plastic or composite materials. In addition, the substrate may be coated with a smooth layer of an adherent second material to provide further surface uniformity and/or to act as a base for other functional layers to be deposited thereon. In all cases it will be recognized that chemical inertness as well as dimensional stability over a prolonged period of time and during the embossing process of this invention are essential properties of whatever substrate material is chosen. Aluminum, polycarbonates and glass are preferred substrate materials.

2. Active Layer

As taught in U.S. Pat. Nos. 4,719,615, 4,852,075 and 4,912,696, erasable optical storage media using the dyed polymeric layer of the invention are comprised of a substrate and an active layer comprising a first material for an expansion layer and a second material for a retention layer, the dual layer being susceptible to expansion and relaxation, to writing data thermally, to reading data optically, and preferably to erasing data thermally and mechanically, the first (expansion layer) material and the second (retention layer) material being bonded together and the first material and the second material remaining in the said state upon the expansion and relaxation of the dual layer. Data are written on the dual layer structure by heating the second material above its glass transition temperature to make the second material rubbery, heating the first material to elastically expand it within its elastic limit, thus causing the heated first material to expand elastically and push up the heated second material. The expanded second material is then cooled to below its transition temperature while the first material is in a stretched, expanded condition, the cooled second material then forming a reversibly fixed deformation and holding the first material in the stretched, expanded condition. Heating is accomplished in at least the lower of these layers by absorption of laser radiation by the dyed polymeric material of this invention. Typically data bits are recorded and erased in the storage medium by a first wavelength write laser beam and a second wavelength erase laser beam. The first material absorbs and the second material predominately transmits the first laser beam, and the second material predominately absorbs the second laser beam. The first laser beam is focused on the first material to heat and elastically expand the first material to write the data bit, and the second laser beam is focused on the second material to heat the second material and to erase the data bit. During writing of the data bit, the second material is sufficiently softened by the expanding material to form a dome over the expanded material. Due to its rapid cooling, the dome holds or retains the expanded first material in place until the dome is heated by the second focused laser which allows both the first and second materials to relax into their original positions. Thus, the data bit is in the form of a solid bump, not a hollow "blister" or bubble.

Polymeric components which are the primary components of the first material of the expansion layer as well as the second material of the retention layer usually are relatively transparent to incident laser radiation. Therefore, colorants such as dyes or pigments are typically dispersed in each layer to increase absorption for the specified laser radiation. As used herein the term "dispersion" refers to either homogeneous or nonhomogeneous dispersions and thus includes solutions as well as suspensions of insoluble phases in a dispersion medium.

The dye or colorant functions to convert incident laser radiation into thermal energy by a substantially nondestructive mechanism which, except for physical thermal effects, is free of chemical change. For the high resolution needed, the colorant in the first expansion layer should preferably be completely dissolved in the polymeric matrix to form a solid homogeneous solution at concentrations which efficiently absorb the laser radiation in the layer thickness used.

Any stable, compatible visible or near-infrared-absorbing dye can be used in the process of the invention. For example, the dye salts of U.S. patent applications Ser. No. 07/132,476, filed Dec. 14, 1987 and 07/375,101, filed Jun. 30, 1989 and incorporated herein by reference, have been found to be useful absorbers in the dual layer structures, particularly for laser sources emitting in the near infrared region of the spectrum. The dye salts form homogeneous, solid, polymeric solutions which are useful in either the expansion or retention layers. Complete solid solutions of these dyes in elastomeric polymeric materials are particularly useful as the expansion layer. Dye salts disclosed in the above-referred -476 application correspond to the structure:

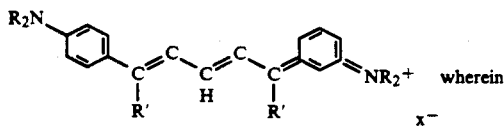 wherein

R is independently selected from $C_{1-4}$ alkyl groups;
R' is independently selected from

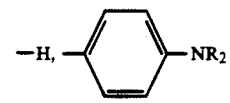

and alkyl, aryl or alkaryl groups, any of which may be substituted, R' optionally completing a cyclic structure with the polymethine chain or with the adjacent phenyl ring via a ring substituent; and X is an anionic moiety selected from fluorosulfonate; perfluoroalkyl and alkyl, alkaryl, aralkyl, aryl, fluoroaryl, vinylic and acrylic sulfonates; 2-acrylamido-2-methylpropanesulfonate; alkyl, alkaryl, aralkyl, aryl, and fluoroarylcarboxylates.

Particularly preferred among these dye salts is 1,1,5,5-tetrakis(p-dimethylaminophenyl)-2,4-pentadien-1 of trifluoromethylsulfonate. Dyes disclosed in the above referred U.S. patent application Ser. No. 07/375,101 correspond to the structures:

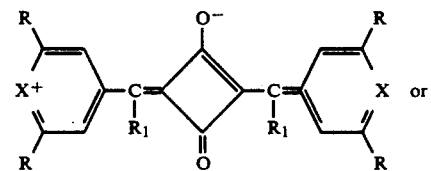

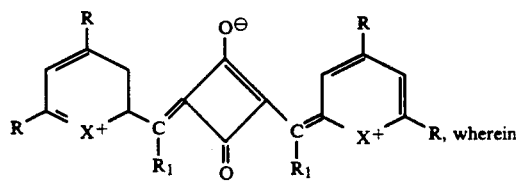

X is a chalcogen atom selected from O, S, Se, Te and mixtures and alloys thereof;

R is a hydrocarbyl moiety independently selected from $C_{1-12}$ alkyl and cycloalkyl and $C_{5-12}$ aryl, aralkyl and alkaryl groups; and $R_1$ is independently selected from —H and —CH$_3$ groups.

One of the advantages of this type of dye is that it can be used effectively at very small concentrations. Thus a very small amount can be used which does not adversely affect the rheological properties of the expansion and retention layers. It is therefore unnecessary to use more than 20% wt. of the dye and preferably no more than 10% wt. or even less. Though still higher dye concentrations, e.g., up to 30% wt., can be used, they are little, if any, more effective.

The first material and the second material preferably are polymers and more preferably amorphous polymers. Specifically, the first material can be, for example, elastomers having the above-mentioned thermoplastic properties and physical characteristics. Suitable elastomers include butyl rubbers, silicone rubbers, natural rubbers, ethylene copolymers, styrene-butadiene rubbers and a number of other synthetic rubbers. So long as these materials have the above-identified physical properties, they also can be hardenable by means of light, heat or any other form of radiation.

Suitable polymers for the second material are amorphous polymers having the thermosetting or thermoplastic properties with characteristics mentioned above. These may include, for example, cellulose acetate, cellulose acetatebutyrate, polystyrene, polysulfonamide, polycarbonate, cellulose nitrate, hydroabietyl alcohol, such as, poly(ethyl-methacrylate), poly(vinyl butyrate), aromatic polyester, polyamides, epoxy resins, and a wide variety of combinations thereof. Other amorphous polymers that can be used include acrylic polymers, polyvinyl acetate, silicone resins, alkyd resins, styrene-butadiene copolymers, vinyl chloride-vinyl acetate copolymers, nitrocellulose, ethylcellulose, polyvinyl alcohol, gelatin glue, casein, egg albumin and various other polymers.

While the above-described dyes typically will be used in the expansion layer, they may also be used in the second (retention) layer. Either or both layers may contain other dyes or secondary pigments. Examples of such dyes or pigments that can be used to tune the first material or the second material are nigrosine dye, aniline blue, Calco Oil Blue, chrome yellow, ultramine blue, Quinoline Yellow, methylene blue chloride, Monastral Blue, Malachite Green Ozalate, Rose Bengal, Monastral Red, Sudan Black BM, and mixtures thereof. Other examples of dyes include those disclosed in U.S. Pat. No. 3,689,768 at column 3, lines 1-22 and U.S. Pat. No. 4,336,545 at column 8, lines 53-68, which patents are incorporated herein by reference for these dyes or pigments. As used herein, the term "acrylic" includes both acrylic and methacrylic configurations.

The use of the above-described bilayer structure to make a master/stamper will now be described by reference to the first three figures of the Drawing.

FIG. 1 shows a section of a small bit area of an optical medium for storing one data bit of logic 1 or logic 0 (representative of the state of reflectivity of that portion of the optical medium). In particular, each bit area of the optical medium includes a substrate 10 and a dual layer 12 deposited on the substrate 10. As will be further described, the dual layer 12 is susceptible to expansion and relaxation, to writing data thermally (expansion), to erasing data thermally and mechanically (relaxation) and to reading data optically. FIG. 1 shows the dual layer 12 in a condition of relaxation corresponding to one logic state, e.g., logic 0, whereas FIG. 2 shows the dual layer 12 in the condition of expansion representing the other logic state, e.g., logic 1.

The dual layer 12 has a bottom layer 14 of one material 18 and a top layer 16 of another material 20. Other than expansion and relaxation of material 18 and transitional softening and hardening of material 20, neither material changes phase to a liquid upon expansion or relaxation of the dual layer 12, thereby increasing the speed or data rate and reducing the power requirements at which data bits can be written and erased. The material 18 and material 20 are bonded together at their interface 22 so as to erase a data bit at a high data rate, as will be further described. In addition, as shown in FIG. 2, the material 18 is deposited on the substrate 10 such that at their interface 24, material 18 does not delaminate from substrate 10 upon expansion of the dual layer 12. This substantially eliminates any "creep" of layer 14 about substrate 10 whereby the bit area will remain optically smooth after repeated erase/write cycles, as will be further described. Thus, as illustrated in FIG. 2, as a result of the bonding at interface 22 and at interface 24, upon expansion of the dual layer 12, material 18 and material 20 will continue to be bonded together, while material 18 will still be in contact with and not be delaminated from substrate 10.

Figure 2:
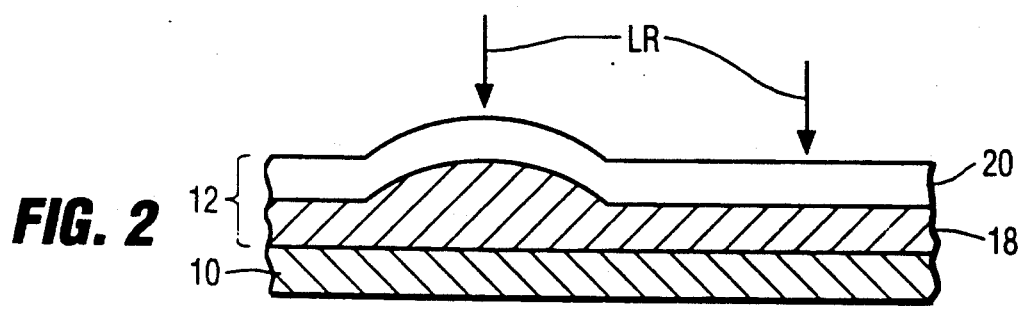
FIG. 2 is a schematic representation of a operation of the master/stamper in the read mode.

In FIG. 2, material 18 and material 20 undergo the mechanical forces which are produced in response to the expansion of the dual layer 12. As will be further described, these forces function, in part, to relax the dual layer 12 to the condition shown in FIG. 1 for the purpose of quickly erasing a data bit.

Material 18 of the expansion layer 14 has (1) low thermal conductivity, (2) a high coefficient of thermal expansion (TCE), and (3) a glass transition temperature, Tg, considerably below ambient temperature. That is, in connection with Tg, the material 18 is rubbery at ambient temperature as opposed to being in a glassy or brittle condition. This means that only relatively low-power heating is required to heat the rubbery material, resulting in localized extensive or large and rapid expansion of the material 18 due to the action of these three properties. Also, as a result of this localized expansion, high data storage density can be achieved. Material 18 also is relatively highly cross-linked, so that upon expansion it undergoes substantially no viscous flow. In addition, material 18 is elastic (i.e., it has a high coefficient of elasticity) so that upon expansion it will stretch without exceeding its elastic limit, resulting in the production of springlike force $F_1$ which tends to return material 18 to its relaxed condition upon cooling or removal of the stress. Other properties and characteristics of material 18 will be described below.

Material 20 of the retention layer 16 has (1) a glass transition temperature, Tg, for example 100° C., which is substantially higher than ambient temperature. Thus, at ambient or normal temperatures, material 20 is glassy or brittle, but when heated above its glass transition temperature, it immediately transforms through a leathery or pliable condition into a rubbery condition. Material 20 also has (2) a relatively low thermal conductivity, and (3) relatively low coefficient of thermal expansion (TCE).

Material 20 has a modulus of elasticity that varies with temperature and results in a force $F_4$ being produced upon expansion. This modulus decreases with increasing temperature, which means that the material 20 needs less of a stress to induce a strain in the material 20. This results in a strain being induced very quickly at low light power, resulting in a bump being formed, as shown in FIG. 2.

Layers 14 and 16 are optically coupled so that substantially all the light that is propagated through layer 16 is absorbed in layer 14. This optical coupling is provided by the material 20 having about the same index of refraction as material 18. Thus, since substantially all this light can be coupled through top layer 16 to bottom layer 14, there is essentially no loss of light and therefore low-power light sources can be used.

Material 18 and material 20 are also capable of being optically tuned to any of a plurality of desired or given wavelengths of light. To accomplish this tuning, materials 18 and 20 can each constitute a light-transparent material that has added to it a dye or pigment to cause the respective material 18 and material 20 to absorb the given wavelength of light. For reasons to be discussed more fully below, materials 18 and 20 will be tuned to absorb different wavelengths of light with material 20 being substantially, but not entirely, transparent to the wavelength of light that can be absorbed by the material 18. This optical tuning has the advantage of making the optical data storage medium highly flexible in that it can be tuned to operate with a variety of different laser sources that are currently available or that might become available in the future.

Layers 14 and 16 also are thermally coupled together. That is, the material 18 and the material 20 have different heat capacities with material 18 being on the inside and material 20 being on the outside of dual layer 12.

3. Write Mode

FIG. 1 and FIG. 2 illustrate a method for writing a data bit thermally at the bit area. With reference to FIG. 1, assume that the bit area of the erasable optical data storage medium is in the relaxed condition described in connection with FIG. 1. In this relaxed condition, at ambient temperature, material 18 is above its glass transition temperature, and, therefore, rubbery, whereas material 20 is below its glass transition temperature and therefore glassy. Also, at this time, none of the mechanical forces $F_1$-$F_4$ have been produced. Furthermore, the material 18 and material 20 have the other properties and characteristics previously described, including the fact that material 18 and material 20 are highly elastic and slightly elastic, respectively.

Then, to write a data bit thermally, the method includes heating the material 18 to expand the material 18 within its elastic limit. At this time of heating material 18, material 20 is also heated above its glass transition temperature, which softens the material 20 and makes it rubbery. Preferably, as shown in FIG. 1, the heating of materials 18 and 20 is accomplished by generating a laser beam LW that has a wavelength to which material 20 is substantially transparent and to which material 18 is absorptive and focusing the laser beam LW through the material 20 onto the material 18. The light of the laser beam LW is slightly absorbed by the material 20 to produce the heat for making this material 20 rubbery and is substantially absorbed by material 18 for elastically expanding the material 18 onto the material 20.

Then, as shown in FIG. 2, the heated material 18 expands and pushes up the heated material 20 creating a solid deformation or bump while the heated material 18 stretches elastically. The next step includes cooling the expanded material 20 below its glass transition temperature, to harden it while material 18 remains in the stretched expanded condition. Upon cooling, material 20 forms a reversibly fixed deformation or bump and holds the material 18 in the stretched, expanded condition. Thus, at this time, a data bit of one logic level, e.g., logic 1, has been written with the bit area being in the expanded condition described in connection with FIG. 2. If a logic 0 were to be rewritten at the bit area, then laser beam LW would not be actuated and the bit area would remain in the relaxed condition shown in the second position in FIG. 2.

As an alternative to the above-described heating step in which material 20 slightly absorbs the light of the laser beam LW, material 20 may absorb no such light. Rather, a small amount of the heat that is absorbed in material 18 is conducted or transferred to material 20 to heat the latter above its glass transition temperature.

As another alternative to the heating step shown in FIG. 1 in which only the laser beam LW is used, the method can include first heating the material 20 above its glass transition temperature by generating a second laser beam, e.g., LE, and focusing that laser beam on the material 20. The second laser beam is of a wavelength that is substantially absorbed by material 20. Immediately thereafter, the laser beam LW is actuated and focussed on the material 18 as described above, with the method for writing the data bit thermally continuing also as described above. One advantage to using the second laser beam initially is more quickly to bring the material 20 to a rubbery condition and thereby be able to form a data bit more quickly.

4. Erase Mode

Figure 3:
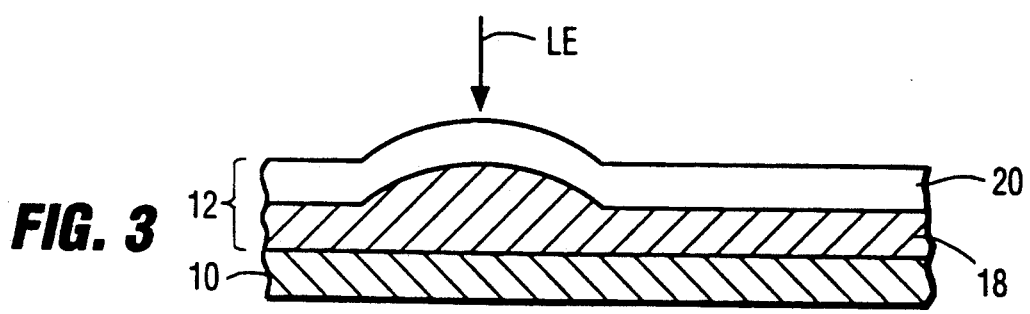
FIG. 3 is a schematic representation of the operation of the master/stamper in an erase mode.

Though this property is not essential to the practice of the invention, the above-described bump-forming active layer has the unique advantage of being erasable. FIG. 3 discloses the method for erasing a data bit thermally and mechanically. Assume that the bit area has a data bit written as illustrated in FIG. 3 which shows the same expanded condition for the bit area as in FIG. 2 in which the material 20 is holding the material 18 in an expanded, stretched condition at ambient temperature. Then the method includes heating the material 20 to a temperature above the glass transition temperature to make the material 20 rubbery. This heating of the material 20, as shown in FIG. 3, can be accomplished by generating and focusing the laser beam LE onto material 20. The heating of material 20 causes a relaxation of the retention action by material 20 of material 18, thereby allowing the mechanical forces $F_1$-$F_4$ rapidly to return the bit area to the relaxed condition shown in FIG. 1. In particular, the elastic force $F_1$ in the material 18 is the dominant force causing a quick return of the dual layer 12 to the relaxed condition. Upon this relaxation, the material 20 is pulled back in by force $F_1$ and force $F_3$ and has an intermediary condition forming a pit. After being totally cooled to ambient temperature, the material 20 and the overall dual layer 12 returns to the fully relaxed condition as was described in connection with FIG. 1. The dual layer 12, upon cooling, returns to an optically smooth condition in that any peaks and valleys (not shown) within the material 20 are no higher and lower than ¼ wavelength of light.

Moreover, as indicated below, dual layer 12 has a relaxation time which is dependent in part on forces produced in response to the viscoelastic properties of the material 18. This relaxation time accelerates upon increasing the temperature of material 20.

5. Read Mode

Both the master/stamper and the information-containing media made therefrom by embossing are read using a focused laser beam in the manner described below. FIG. 2 illustrates a method of reading a data bit optically. Assume that a data bit, for example a logic 1, has been written at the left bit area as shown in FIG. 2 in which the bump has been formed as described above. To read this data bit, the read laser beam LR, which is at a lower power level than is used for writing or erasing the data bit, is generated and focussed on the bump of the material 20. Similarly, assume a data bit of logic 0 has been written in the right bit area as shown in FIG. 2, i.e., no bump is produced. Again, the read laser beam LR at lower power level than is used for writing or erasing the data bit is generated and focussed on the material 20.

In both read instances, the light of read beam LR will be reflected from the material 20. Due to the difference in thickness or height between the expanded condition of dual layer 12 shown in the left portion of FIG. 2 and the relaxed condition of the dual layer 16 shown in the right portion of FIG. 2, there is a phase shift between the light of laser beam LR that is reflected from the material 20, respectively. This phase shift or difference can be detected with a high signal-to-noise ratio to distinguish a logic 1 bit from a logic 0 bit. Alternatively, there will be a difference in the light scattering and hence difference in amplitude of the reflected light between the left and right portion of FIG. 2. These transitions in amplitude can be detected with a high signal-to-noise ratio as logic 1 and logic 0 bits. More light scattering and hence reduced amplitude will be detected in the left portion of FIG. 2 condition than the right portion condition.

Figure 6:
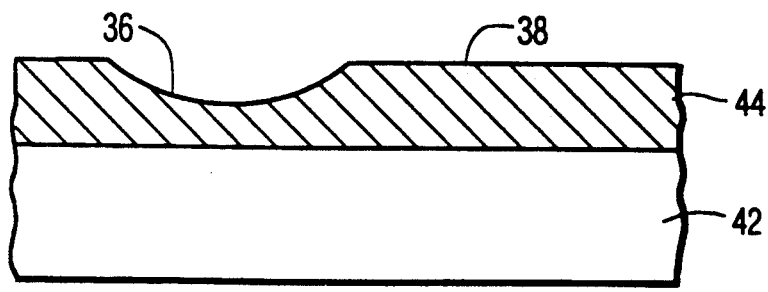
FIG. 6 is a schematic representation of an embossed replica.
Figure 7:
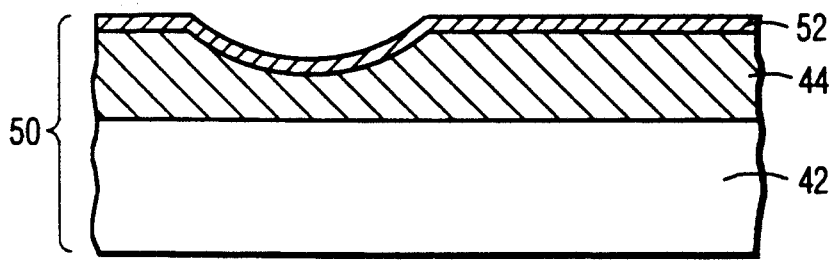
FIG. 7 is a schematic representation of an embossed replica depicting presence of a reflective layer.

For the purpose of this invention, the medium depicted in FIG. 2 having fixed deformations or bumps (logic 1) and unmarked lands (logic 0) forms the direct effect master/stamper or die used to emboss and fix supported soft hardenable layers, thereby producing replicas depicted in FIGS. 6 and 7 without further processing.

B. Replica Medium

The medium is comprised of a dimensionally stable transparent sheet support or substrate and a soft photohardenable layer thereon which may be applied to the substrate surface by any conventional coating (e.g., spin coating) or film lamination process. The medium may also contain several ancillary layers such as an intermediate adhesion layer to improve adhesion between the substrate and the photohardenable layer, a thin release layer superposed on the photohardenable layer to promote release of the stamper during processing, a reflective layer to mirrorize the media prior to processing, etc.

1. Substrate

The dimensionally stable sheet support or substrate may be a preformed disc blank or it may be a sheet or web from which disc media are to be formed. The substrate functions as the support for the photohardened information carrying layer as well as a dust defocusing layer through which a laser beam passes to reflect the encoded signal at the reflective layer. The variation in the reflected laser beam passing back through the substrate is "read" by a detector and converted to a suitable output signal. To function as a suitable substrate, the disc or sheet should be substantially transparent to the "read" laser radiation, it should be uniformly thick across the entire signal carrying surface area, have minimum birefringence, have a refractive index matched to the photohardened layer and have a final disc geometry suitable for the end use contemplated, e.g., CD-audio, CD-ROM, Video, etc. Current industry optical standards require:

the thickness of the transparent disc substrate to be 1.2±0.1 mm excluding reflection layer, protection layer, and labeled;

the refractive index of the transparent substrate to be 1.55±0.1 at the 780–840 wavelength;

maximum birefringence of the transparent substrate to be 100 nm double pass;

the laser beam reflection and substrate transmission (double pass) to be 70 to 90 percent; and maximum variation of laser beam reflection and double pass substrate transmission to be 3 per cent across the substrate surface.

As indicated earlier, optical media geometry and standards may vary depending on the use of the media. Current industry standards for the geometry of compact discs require:

the outer diameter of the disc to be 120±0.3 mm with an eccentricity of at most±0.2 mm relative to the center hole largest inner circle;

the outer edge to be free from burrs and may be chamfered or rounded;

the disc weight to be 14 to 33 g;

the center hole to be cylindrical with a diameter of 15.0 to 15.1 mm;

the hole edge to be free from burrs at the information side of the disc and may be chamfered or rounded; and the thickness of the disc to be 1.1 to 1.5 mm (1.2 mm preferred) including protection layer and label.

The blank substrate can be formulated from many polymeric materials provided that the optical criteria are met. Typical of such polymeric materials used are polymethyl methacrylate, polycarbonate and polyolefins. Of these, polycarbonate is preferred for use in single-sided disc structures, e.g., compact disc, due to its dimensional stability during environmental changes. In some instances, glass, quartz or other transparent inorganic materials may be used as the blank substrate. Typically polymeric materials are preferred due to their low cost and ease of manufacture of discs therefrom.

Blank disc substrates may be formed by conventional molding methods, such as injection or injection/compression molding methods, or they may be cut or stamped from preformed sheets of the substrate material. In one embodiment of this invention, the geometry of substrate is preformed before application of the photohardenable layer. In an alternate embodiment, the geometry of the substrate is cut or stamped from sheets of substrate material after the photohardenable layer has been applied thereto. In the alternate embodiment, it is possible to carry out all the manufacturing steps through application of the label before cutting or stamping the disc geometry from the processed sheet medium. In the instance when the processed sheet substrate medium contains an information track(s), the disc is cut or stamped therefrom in register with that information track(s).

2. Hardenable Layer

Many hardenable materials may be used as the soft embossable layers provided the material can be fixed in its embossed state. Typically, the hardenable layers are supported by a suitable transparent substrate. Such hardenable layers may be applied to the substrate by any conventional method. For example, the hardenable layer can be applied in liquid form by spin coating or it can be applied in solid form by laminating a pre-formed dry layer of the hardenable material. However, in some instances the surface of the substrate itself may be temporarily softened, e.g. by heat or liquid treatment. In most instances, the hardenable layer is fixed in the embossed state by some catalytic process. Particularly useful in the process of this invention are soft, solid photohardenable materials and elements such as disclosed in U.S. patent application Ser. No. 07/375,100 filed Jun. 30, 1989. The process of this invention will be more fully described in the context of embossing supported soft photohardenable layers.

By "soft photohardenable layer" is meant a substantially solvent-free layer having a creep viscosity of about 20 megapoises or greater and preferably between about 100 and 200 megapoises, as measured with a parallel plate rheometer. Such "soft photohardenable layers" are contrasted with conventional liquid photohardenable layers which typically have viscosities of about several hundred poises or less. For the purpose of this invention, viscosity is measured as creep viscosity with a parallel plate rheometer using a Du Pont Model 1090

Thermal Mechanical Analyzer. In this procedure, a 0.036 inch thick sample is placed in contact between two flat discs (about 0.25 inch diameter). A quartz probe which is capable of accepting additional weights is positioned atop the upper disc and the sample/disc assembly is maintained at constant temperature of 40° C. and RH of 44% throughout the measurement. Creep viscosity is calculated from the rate of decrease of sample thickness under equilibrated conditions. The 0.036 inch sample is prepared by laminating together sufficient layers of the test film to obtain the desired thickness. The laminate is then cut to provide a circular sample slightly larger in diameter than that of the rheometer plates.

Uniformly thick soft photohardenable layers useful in this invention typically have a thickness which compliments the thickness of the blank substrate so that the thickness criteria of the finished product is met, e.g., 1.1 to 1.5 mm for a compact disc. Useful layer thickness range from about 0.1 micron to about 130 microns with preferred thickness being below 30 microns. By "soft photohardenable layer" is meant a substantially solvent-free solid layer having a viscosity as defined above.

The photohardenable layer should be firmly adhered to the substrate surface and should have optical characteristics comparable to those of the substrate. Preferably the refractive index of the photohardenable layer should be that of the substrate ±0.1 measured at the same wavelength.

The photohardenable layer is a thermoplastic composition which upon exposure to actinic radiation forms cross-links or polymers of higher molecular weight to change the rheological character of the composition and decrease its solubility in common solvents. Preferred photohardenable compositions are photopolymerizable compositions wherein free radical addition of polymerization and crosslinking of a compound containing one or more ethyelnically unsaturated groups, usually in a terminal position, hardens and insolubilizes the composition. The sensitivity of the photopolymerizable composition is enhanced by a photoinitiating system which may contain a component which sensitizes the composition to practical radiation sources, e.g., visible light. Conventionally a binder is the most significant component of a substantially dry soft photopolymerizable layer in terms of what physical properties the layer will have while being used in the process of the invention. The binder serves as a containing medium for the monomer and photoinitiator prior to exposure, and after exposure contributes to the physical and optical characteristics needed for the optical media formed. Cohesion, adhesion, flexibility, miscibility, tensile strength and index of refraction are some of the many properties which determine if the binder is suitable for use in an optical media. In practicing the invention, soft photopolymerizable layers and elements of various types may be used such as types disclosed in U.S. Pat. Nos. 3,469,982; 4,273,857; 4,278,752; 4,293,635; 4,621,043; 4,693,959; 4,323,636; 3,649,268; 4,191,572; 4,247,619; 4,326,010; 4,356,253; and European Patent Application 87106145.3 filed Apr. 28, 1987.

Soft photohardenable layers and elements contemplated to be equivalent are photodimerizable or photocrosslinkable compositions such as disclosed in U.S. Pat. No. 3,526,504 or those compositions in which hardening is achieved by a mechanism other than the free radical initiated type identified above.

In general, the photopolymerizable compositions useful in carrying out this invention contain an ethylenically unsaturated monomer, a free radical-generating initiating system, a binder and other adjuvants.

Suitable monomers which can be used as the sole monomer or in combination with others include the following: t-butyl acrylate, 1,5-pentanediol diacrylate, N,N-diethylaminoethyl acrylate, ethylene glycol diacrylate, 1,4-butanediol diacrylate, diethylene glycol diacrylate, hexamethylene glycol diacrylate, 1,3-propanediol diacrylate, decamethylene glycol diacrylate, decamethylene glycol dimethacrylate, 1,4-cyclohexanediol diacrylate, 2,2-dimethylolpropane diacrylate, glycerol diacrylate, tripropylene glycol diacrylate, glycerol triacrylate, trimethylolpropane triacrylate, pentaerythritol triacrylate, polyoxyethylated trimethylolpropane triacrylate and trimethacrylate and similar compounds as disclosed in U.S. Pat. No. 3,380,831, 2,2-di)p-hydroxyphenyl)-propane diacrylate, pentaerythritol tetraacrylate, 2,2-di-(p-hydroxyphenyl)-propane dimethacrylate, triethylene glycol diacrylate, polyoxyethyl-2,2-di-(p-hydroxyphenyl)-propane dimethacrylate, di-(3-methacryloxy-2-hydroxypropyl) ether of bisphenol-A, di-(2-methacryloxyethyl) ether of bisphenol-A, di-(3-acryloxy-2-hydroxypropyl) ether of bisphenol-A, di-(2-acryloxyethyl) ether of bisphenol-A, di-(3-methacryloxy-2-hydroxpropyl) ether of tetrachloro-bisphenol-A, di-(2-methacryloxyethyl) ether of tetrachloro-bisphenol-A, di-(3-methacryloxy-2-hydroxypropyl) ether of tetrabromo-bisphenol-A, di-(2-methacryloxyethyl) ether of tetrabromo-bisphenol-A, di-(3-methacryloxy-2-hydroxypropyl) ether of diphenolic acid, triethylene glycol dimethacrylate, polyoxypropyl-trimethylol propane triacrylate (462), ethylene glycol dimethacrylate, butylene glycol dimethacrylate, 1,3-propanediol dimethacrylate, 1,2,4-butanetriol trimethacrylate, 2,2,4-trimethyl-1,3-pentanediol dimethacrylate, pentaerythritol trimethacrylate, 1-phenyl ethylene-1,2-dimethacrylate, pentaerythritol tetramethacrylate, trimethylol propane trimethacrylate, 1,5-pentanediol dimethacrylate, diallyl fumarate, styrene, 1,4-benzendiol dimethylacrylate, 1,4-diisopropenyl benzene, and 1,3,5-triisopropenyl benzene.

In addition to the ethylenically unsaturated monomers mentioned above, the photohardenable layer can also contain one or more free radical-initiated, chain-propagating, addition polymerizable, ethylenically unsaturated compounds generally having a molecular weight of at least about 300. Preferred monomers of this type are an alkylene or a polyalkylene glycol diacrylate prepared from an alkylene glycol of 2 to 15 carbons or a polyalkylene ether glycol of 1 to 10 ether linkages, and those disclosed in U.S. Pat. No. 2,927,022, e.g., those having a plurality of addition polymerizable ethylenic linkages particularly when present as terminal linkages. Especially preferred are those wherein at least one and preferably most of such linkages are conjugated with a double-bonded carbon, including carbon double-bonded to carbon and to such heteroatoms as nitrogen, oxygen and sulfur. Outstanding are such materials wherein the ethylenically unsaturated groups, especially the vinylidene groups, are conjugated with ester or amide structures.

Preferred free radical-generating addition polymerization initiators activatable by actinic light and thermally inactive at and below 185° C. include the substituted or unsubstituted polynuclear quinones which are compounds having two intracyclic carbon atoms in a conjugated carbocyclic ring system, e.g., 9,10-anthraquinone, 1-chloroanthraquinone, 2-chloroanthraquinone, 2-methylanthraquinone, 2-ethylanthraquinone, 2-tert-butylanthraquinone, octamethylanthraquinone, 1,4-naphthoquinone, 9,10-phenanthraquinone, 1,2-benzanthraquinone, 2,3-benzanthraquinone, 2-methyl-1,4-naphthoquinone, 2,3-dichloronaphthoquinone, 1,4-dimethylanthraquinone, 2,3-dimethylanthraquinone, 2-phenylanthraquinone, 2,3-diphenylanthraquinone, sodium salt of anthraquinone alphasulfonic acid, 3-chloro-2-methylanthraquinone, retenequinone, 7,8,9,10-tetrahydronaphthacenequinone, and 1,2,3,4-tetrahydrobenz(a)anthracene-7,12-dione. Other photoinitiators which are also useful, even though some may be thermally active at temperatures as low as 85° C., are described in U.S. Pat. No. 2,760,863 and include vicinal ketaldonyl alcohols, such as benzoin, pivaloin, acyloin ethers, e.g., benzoin methyl and ethyl ethers; a-hydrocarbon-substituted aromatic acyloins, including a-methylbenzoin, a-allylbenzoin and a-phenylbenzoin. Photoreducible dyes and reducing agents disclosed in U.S. Pat. Nos. 2,850,445; 2,875,047; 3,097,096; 3,074,974; 3,097,097; and 3,145,104 as well as dyes of the phenazine, oxazine, and quinone classes; Michler's ketone, benzophenone, 2,4,5-triphenylimidazolyl dimers with hydrogen donors, and mixtures thereof as described in U.S. Pat. Nos. 3,427,161; 3,479,185 and 3,549,367 can be used as initiators. Similarly the cyclohexadienone compounds of U.S. Pat. No. 4,341,860 are useful as initiators. Also useful with photoinitiators are sensitizers disclosed in U.S. Pat. Nos. 3,652,275; 4,162,162; 4,454,281; 4,535,052 and 4,565,769.

Suitable binders which are polymeric when employed with polymerizable monomers can be used alone or in combination with one other include the following: polyacrylate and alpha-alkyl polyacrylate esters, e.g., polymethyl methacrylate and polyethyl methacrylate; polyvinyl esters, e.g., polyvinyl acetate, polyvinyl acetate/acrylate, polyvinyl acetate/methacrylate and hydrolyzed polyvinyl acetate; ethylene/vinyl acetate copolymers; polystytrene polymers and copolymers, e.g., with maleic anhydride and esters; vinylidene chloride copolymers, e.g., vinylidene chloride/acrylonitrile; vinylidene chloride/methacrylate and vinylidene chloride/vinyl acetate copolymers; polyvinyl chloride and copolymers, e.g., polyvinyl chloride/acetate; saturated and unsaturated polyurethanes; synthetic rubbers, e.g., butadiene/acrylonitrile, acrylonitrile/butadiene/styrene, methacrylate/acrylonitrile/butadiene/styrene copolymers, 2-chlorobutandiene-1,3 polymers, chlorinated rubber, and styrene/butadiene/styrene, styrene/isoprene/styrene block copolymers; high molecular weight polyethylene oxides of polyglycols having average molecular weights from about 4,000 to 1,000,000; epoxides, e.g., epoxides containing acrylate or methacrylate groups; copolyesters, e.g., those prepared from the reaction product of a polymethylene glycol of the formula HO(CH$_2$)$_n$OH, where n is a whole number 2 to 10 inclusive, and (1) hexahydroterephthalic, sebacic and terephthalic acids, (2) terephthalic, isophthalic and sebacic acids, (3) terephthalic and sebacic acids, (4) terephthalic and isophthalic acids, and (5) mixtures of copolyesters prepared from said glycols and (i) terephthalic, isophthalic and sebacic acids and (ii) terephthalic, isophthalic, sebacic and adipic acids; nylons or polyamides, e.g., N-methoxymethyl polyhexamethylene adipamide; cellulose esters, e.g., cellulose acetate, cellulose acetate succinate and cellulose acetate butyrate; cellulose ethers, e.g., methyl cellulose, ethylene cellulose and benzyl cellulose; polycarbonates; polyvinyl acetal, e.g., polyvinyl butyral, polyvinyl formal; polyformaldehydes. Acid containing polymers and copolymers functioning as suitable binder include those disclosed in U.S. Pat. Nos. 3,458,311 and 4,273,857. Amphoteric polymeric binders are disclosed in U.S. Pat. No. 4,293,635.

In place of or in addition to the polymeric binder listed above, particulate thickeners with discrete orderly orientation can be used such as disclosed in Kuchta, U.S. Pat. No. 3,754,920, e.g., silicas, clays, alumina, bentonites, kalonites, etc., provided the index of refraction is correctly matched to that of the photohardened layer.

Other components in addition to those described above can be present in the photopolymerizable compositions in varying amounts. Such components include optical brighteners, ultraviolet radiation absorbing material, thermal stabilizers, hydrogen donors and release agents.

Optical brighteners useful in the process of the invention include those disclosed in Held, U.S. Pat. No. 3,854,950, incorporated herein by reference. A preferred optical brightener is 7-(4'chloro-6'-diethylamino-1',3'5'-triazine-4'-yl) amino 3-phenyl coumarin. Ultraviolet radiation absorbing materials useful in the invention are also disclosed in Held, U.S. Pat. No. 3,854,950.

Useful thermal stabilizers include hydroquinone, phenidone, hydroquinone monomethyl ether, p-methoxyphenol, alkyl and aryl-substituted hydroquinones and quinones, tert-butyl catechol, pyrogallol, copper resinate, naphthylamines, betanaphthol, cuprous chloride, 2,6-di-tert-butyl p-cresol, phenothiazine, pyridine, nitrobenzene, dinitrobenzene, p-toluqinone and chloranil. The dinitroso dimers described in Pazos U.S. Pat. No. 4,168,982 are also useful. Normally a thermal polymerization inhibitor will be present to increase stability in the storage of the photopolymerizable composition.

Hydrogen donor compounds useful in the photopolymer compositions include 2-mercaptobenzocazole, 2-mercaptobenzothiazole, etc., as well as various types of compounds, e.g., (a) ethers, (b) esters, (c) alcohols, (d) compounds containing allylic or benzylic hydrogen cumene, (e) acetals, (f) aldehydes, and (g) amides as disclosed in column 12, lines 18 to 58 of MacLachlan U.S. Pat. No. 3,390,996.

Compounds which have been found useful as release agents are described in Bauer, U.S. Pat. No. 4,326,010. A preferred release agent is polycaprolactone.

Amounts of ingredients in the photopolymerizable compositions will generally be within the following percentage ranges based on total weight of the photopolymerizable layer: monomer, 5-50%, preferably 15-25%, initiator 0.1-10%, preferably 1-5% binder, 25-75%, preferably 35-50%; plasticizer, 0-25%, preferably 5-15%, other ingredients 0-5%, preferably 1-4%.

The soft photohardenable layer is applied to the substrate by any conventional coating or lamination method. The sheet support may be coated with a solution of the photohardenable material by spin coating, roller coating, spray coating, doctor knife coating, bar coating, curtain coating, or any other conventional coating method. Once the solution of photohardenable material has been applied, solvent is removed in a conventional drying process to form the photohardenable layer. Spin coating is a particularly preferred process for applying photohardenable material to a preformed, disc blank substrate. The photohardenable material may also be applied as a solvent-free melt using an extrusion process as described in Chen et al. U.S. Pat. No. 4,323,637. In each of these cases, the coating process results in a substantially solvent-free, dry, soft photohardenable layer.

The photohardenable layer may also be applied to the substrate as a preformed dry film photohardenable element comprised of a temporary base support and a uniformly thick dry, soft photohardenable layer releasedly adhered thereto. The photohardenable element may be cut into sheets or may be in rolled web form for ease of use and storage, and the second side of the photohardenable layer may have a removable protective cover film which is removed before use. In this instance, the surface of the photohardenable layer is applied to the surface of the substrate typically with heat and pressure to produce a laminated element. The temporary base support is then removed to form the replica medium comprising the substrate having the photohardenable layer adhered thereto.

The temporary base support of the photohardenable film element can be any of a number of films such as those described in Cohen U.S. Pat. No. 4,174,216. The primary criteria for the base support is that it possess dimensional stability and the surface smoothness and release characteristics needed to laminate a uniform layer of photohardenable composition to the substrate surface without distortion of the layer when the base support is removed prior to the embossing step. To meet this criteria, the cohesive force of the photohardenable layer and its adhesive force to the substrate must be greater than its adhesive force to the temporary base support. A preferred base support is polyethylene terephthalate.

A second temporary cover film, or interleaf, may be placed on the second surface of the photopolymerizable layer to protect it from contaminants during storage in roll or stacked cut sheet form and to prevent blocking of the stored element. If used, the protective cover film or interleaf is removed from the surface of the photopolymerizable layer before the layer is laminated to the substrate. Any number of films can be used as the cover film provided the film has a suitable surface smoothness and has less adhesion to the photopolymerizable layer than the layer has to the base support. Suitable protective cover films or interleafs include polyethyelene, polypropylene, etc.

The photohardenable layer can be laminated or transferred to the surface of the substrate using any conventional laminating system. Suitable systems for applying a dry film to a substrate include hot roll laminators or laminators with a heated platen or shoe as disclosed in U.S. Pat. Nos. 3,469,982; 3,547,730; 3,649,268; and 4,127,436. Useful laminating systems wherein a liquid is used to enhance adhesion include those disclosed in U.S. Pat. Nos. 3,629,036; 4,069,076; 4,405,394 and 4,378,264.

During lamination, the protective cover film or interleaf, if present, is first removed from the photohardenable layer and the layer is applied to the surface of the substrate under pressure and typically with heat so that interfacial air is removed and void-free adhesion between the substrate and the layer is effected. Preferably a hot roll laminator is used to effect such void-free adhesion.

In those instances where a preformed blank substrate is used, e.g., blank disc, a carrier sheet may be used to carry each preformed substrate or an array of substrates into and through the nip of the laminator to prevent contamination of the rear surface of each substrate. Ordinary paper sheets or webs are suitable as a carrier sheet provided they are lint-free and likewise free of contaminants. Also in those instances where preformed blank substrates are used, excess areas of the photohardenable element are cut from the edges of the laminated substrate, e.g., from the edges and hole of a laminated preformed disc. In those instances where the adhesive/cohesive forces are carefully balanced, trimming of excess photohardenable material from the laminate may be effected by peeling the support sheet therefrom with excess material adhering thereto.

3. Reflective Layer

Any conventional means may be used to render the embossed information track reflective. A reflective layer may be deposited on the embossed surface by sputtering or evaporation of a metal, e.g., aluminum, copper, silver, gold, or alloys thereof or dye onto the embossed surface. Alternatively, a reflective metallic, e.g., silver, layer may be deposited electrolessly using conventional methods as disclosed in "The Technology of Aerosol Plate" by Donald T. Levy in Technical Proceedings 51st Annual Convention American Electroplater's Society, Jun. 14-18, St. Louis, 1964, pp. 139-149, and in U.S. Pat. No. 4,639,382. A reflective dye layer may also be applied to the embossed surface from a solution using conventional coating methods, e.g., spin coating. In this instance, the solvent used in the coating solution should be chosen from materials which does not attack the embossed surface. Dye systems that are useful are polymeric dye systems as disclosed in U.S. Pat. Nos. 4,581,317 and 4,501,876. An additional method of rendering the embossed surface reflective is by coating the surface with a material other than a dye, e.g., a polymeric material, in which the material has an index of refraction which is substantially different from that of the embossed photopolymerized layer for the incident playback radiation, e.g., a difference greater than 0.1. Similar techniques can also be used to render the hardenable polymer reflective before embossing.

4. Protective Layer

After the embossed surface of the media has been rendered reflective, the media is then playable provided it has the physical dimensions needed for the playback system, e.g., prepared from a preformed substrate. Although playable, the reflective surface at the embossed layer interface is susceptible to damage and environmental degradation unless protected by a cover layer. In the instance when the reflective layer consists of a sufficiently thick and tough material, e.g., a polymeric material, the reflective layer itself may be sufficient to protect the reflective interface. Typically, however, a separate layer is applied over the reflective layer for protection and to serve as a surface for subsequent labeling.

The protective layer may be any polymeric film or layer or combination of such which can be adhered to seal the reflective layer and provide a printable abrasion resistant outer surface. The thickness of such a layer or composite may vary provided the overall thickness dimension and weight of the resulting media remain within the required system criteria, e.g., for compact disc between 1.1 to 1.5 mm thick and between 14 and 33 g. Conventionally, a solution of lacquer, such as nitrocellulose, is spin coated over the reflective layer but other preformed layers or films may be used. The preformed layer or film may be a laminatable or adherent curable layer, e.g., a heat or photocurable layer or may be a film, e.g., polyethylene terephthalate, which is adhered to the reflective layer with an adhesive layer. Suitable structured elements and processes suitable for use in protecting the reflective layers include those disclosed in U.S. Pat. Nos. 4,077,830 and assignee's U.S. patent applications, Ser. No. 077,497, filed Jul. 24, 1987 and 031,613, filed Mar. 30, 1987.

Using a negative working peel-apart element and process disclosed in the aforementioned U.S. Pat. No. 4,247,619, a label-bearing protective layer composite can be applied to the reflective layer. In this instance, the tacky layer of an element comprising in order a tacky layer, a photopolymerizable layer and a strippable cover film, e.g., Cromalin ® C4N proofing film, is laminated to the free surface of the reflective layer. The laminate is then exposed to actinic radiation through a mask containing a negative image of the label, the coversheet with exposed areas adhered thereto is stripped from the laminate, and uncovered tacky image areas are toned with dry toner powder, e.g., black. If a full color label is required, the procedure is repeated three additional times using suitable matched color separation masks and the corresponding toners, e.g., yellow, magneta and cyan toner powders. Finally, a fifth element is laminated to the last toned surface and uniformly exposed to actinic radiation to produce a photo-adhered protective surface of the coversheet, e.g., polyethylene terephthalate. In those instances where the label is to be applied in a different manner, only the fifth step is required to seal and protect the reflective layer of the embossed media.

5. Label Application

Any conventional process may be used to apply a label to the protective surface of the reflective media. Typically four color labels are printed individually onto the protective surface of each media using an offset printing process. In the instance where a blank sheet substrate has been used to produce an array of information tracks (media) within the confines of the sheet, the protective surface of the entire sheet array can be printed with a registered array of labels using conventional printing processes including flexography and offset processes. Alternatively, each media section of the array may be printed individually by a conventional step printing process.

6. Media Shape

As illustrated previously, the shape of the media, e.g., disc, may be formed before the process of this invention by conventional molding, stamping or cutting processes or the shape may be formed by cutting or stamping the media from the sheet array. This forming of the media shape from a sheet array typically would occur after the labeling step wherein each media would be cut or stamped in register with the information track therein, from the sheet array. However, the media can be removed from the sheet array in the same manner, once the information track has been embossed in the media area of the sheet. In this instance, each embossed media would be further processed as an individual piece. Similarly, the shape of the media may be formed between any of the intervening steps of the process.

Although the shape of the media may be formed with its final lateral dimensions as indicated above, one or more trimming steps may be introduced to form final dimensions from an outsized media or blank provided the initial dimensions are greater than those specified. This trimming step may be particularly useful, for instance, in cutting or punching the precise center hole in registration to the information track of a circular disc media.

The use of the master/stamper prepared from the bilayer structure as a die to emboss a supported soft photohardenable layer will now be described by reference to the remaining Figures of the Drawing.

Figure 4:
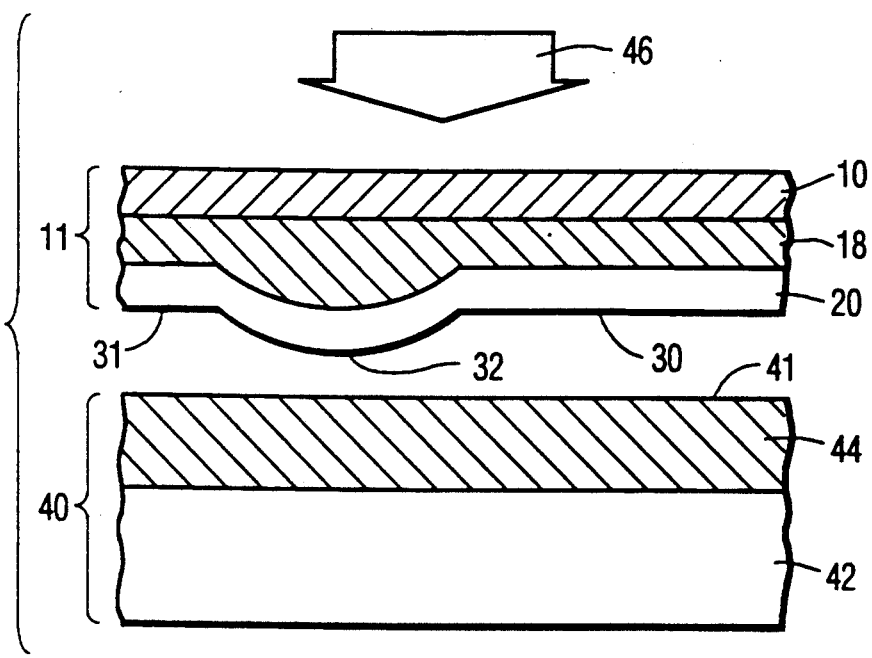
FIG. 4 is a schematic representation of the operation of the invention in the embossing mode.
Figure 5:
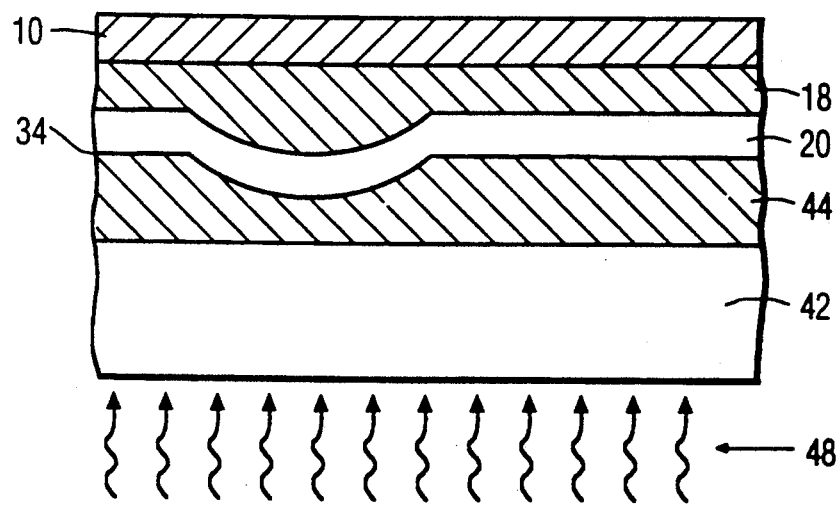
FIG. 5 is a schematic representation of the operation of the invention in the fixing mode.

Referring to FIG. 4, the master/stamper, hereinafter identified as the "stamper" 11, is positioned in surface-to-surface orientation with the soft photohardenable layer 44 of the replica medium 40, hereinafter identified as the "medium", so that the information-carrying surface 31 of stamper 11 having bumps 32 and lands 30 is next to the surface 41 of the photohardenable layer 44 to be embossed. The medium 40 is comprised of a dimensionally stable sheet support 42 that typically is transparent to actinic and visible radiation and a soft photohardenable layer 44 thereon. The sheet support 42 may be in the form of uniformly thick flat sheet or web from which replicas can be cut or punched or it may be a preformed blank formed to the required dimensions of the replica. The soft photohardenable layer 44 may be a single layer, as depicted in FIG. 4, applied to the support 42 or it may be a composite layer comprising individual component layers such as an inner component layer of photohardenable material and an outer component layer of reflective material. Further component layers may be used to improve adhesion between the layers or to the sheet support 42. To protect the information-carrying surface 31 for repetitive embossing steps, it sometimes is desirable to apply a thin release coating to surface 31 to prevent unwanted adherence to the photohardenable surface 41 during embossing. In those instances when the medium 40 is a preformed disc blank, it typically is positioned in register with the information on the stamper 11. Once the stamper 11 and the medium are suitably positioned, pressure 46 is uniformly applied to the stamper substrate 10 to force the information-containing surface 31 into the medium surface 41 as depicted in FIG. 5 to form an embossed structure having an interface 34 between the stamper 11 and the embossed photohardenable layer 44. With stamper in place, the embossed structure is irradiated as depicted in FIG. 5 through support 42 with uniform actinic radiation 48 to harden the photohardenable material, thereby fixing the layer in its embossed state. The stamper 11 is then removed from the embossed structure for reuse in embossing other media. Alternatively, the stamper can be separated from unhardened embossed photohardenable layer 44 and the layer then photohardened.

Figure 8:
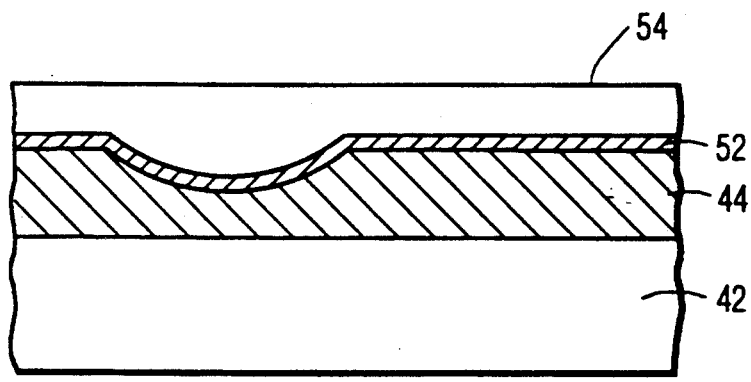
FIG. 8 is a schematic representation of an embossed replica depicting overlying reflective and protective layers.

FIG. 6 illustrates the embossed replica comprised of the sheet support 42 and the embossed photohardened layer 44 having an indentation 36 corresponding to a data bit of logic 1 and a land 38 corresponding to a data bit of logic 0. When used in the read mode, a laser beam passing through the transparent support 42 and photohardened layer 44 of the replica is reflected by the indentation 36 and land 38 and detected in a similar manner to such a beam impinging on the bump 32 and land 30 of the original stamper 11. Although the air/polymer interface of the photohardened layer 44 is sufficient to effect reflection of the incident read laser beam, an added reflective layer 52 typically is applied to the photohardened layer 44 to increase the reflection efficiency as depicted in FIG. 7. The reflective layer 52 is applied either before embossing or after embossing and typically is a metal such as aluminum, copper, silver, gold, etc. or a dye or some other material having an index of refraction which is significantly different from that of the photohardened layer 44. FIG. 8 illustrates a replica having a reflective layer 52 protected by a layer 54 which seals the information-carrying layers and prevents damage due to handling and atmospheric components. The protective layer also functions as a printable surface for applying labels in a conventional manner without affecting the playing characteristics of the replica.

It will be recognized by those skilled in the art the invention can be used for read-only optical media such as CDs and video disks as well as the preformatted information on recordable optical media such as Write-Once and Rewritable Media.

EXAMPLES

EXAMPLE 1

Preparation of the Direct Effect Master/Stamper (DEM/DES)

A. Expansion Layer

In the following example, all mixing and storage were carried out at room temperature in an inert atmosphere of nitrogen in order to minimize any chemical or physical alteration of the components.

| | phr (by wt.) |
|---|---|
| Resin Solution | |
| Urethane (Solithane 113[1]-Morton Thiokol) | 100.0 |
| Dye (Savinyl Scarlet RLS-Sandoz[5]) | 12.0 |
| Solvent (9:1 Methyl Isobutyl Ketone (MIBK)/Nitromethane | 180.0 |
| | 292.0 |
| Surfactant Solution | |
| Surfactant (Fluorad FC-430[2]-3M) (5.0 phr of 10% solution of FC-430 in 9:1 MIBK/Nitromethane) | 0.50 |
| Hardener Solution | |
| Curing Agent A (Triisopropylamine-Aldrich) | 13.2 |
| Curing Agent B (C113-300[3]-Morton Thiokol) | 7.3 |
| Solvent (9:1 MIBK/Nitromethane) | 20.0 |
| | 40.5 |

The surfactant and hardener solutions were added in succession to the resin solution to give the expansion layer solution. Once the hardener solution is added, the time for filtering and coating should not exceed 2 hours. The expansion layer solution was filtered three times through a 47 mm diameter 0.2 micron[6] Teflon filtration unit composed of type 316 stainless steel components. The expansion layer solution (4 ml) was then applied to a clean polycarbonate substrate (130 mm OD, 15 mm ID, 1.2 mm thick) spinning at 400 rpm over 2.3 sec. The polycarbonate substrate was then held at zero spread for 3 sec to allow leveling to occur before final spin-off at 2500 rpm for 30 sec. The layer was then cured for 16 hrs at 100° C. in a convection oven.

B. Retention Layer

| | phr (by wt.) |
|---|---|
| Resin Solution | |
| Epoxy Novolac (DEN 444[4]-Dow Chemical) | 100.0 |
| Solvent (3:1 Cyclohexanone/Nitromethane) | 700.0 |
| Curing Agent A (Trimellitic Anhydride (TMA)-Aldrich) | 30.0 |
| Curing Agent B (2-Ethylhexylamine-Aldrich) | 6.0 |
| Curing Agent C (Dicyclohexylamine-Aldrich) | 6.0 |
| Dye (Savinyl Scarlet RLS-Sandoz[5]) | 6.0 |
| | 848.0 |

The curing agents A, B and C and the dye were successively dissolved in the resin solution to give the retention layer solution. This solution was then successively filtered through a Pall Ultiper DFA 0. micron absolute Teflon filter at 5 psi and two 0.2 micron 47 mm Millipore ® filters at 5-10 psi nitrogen. Coating is performed within a 2-day time period after preparation.

The retention layer solution (4 ml) was then applied to the expansion layer-coated disk at 400 rpm over 2.6 sec. The disk was immediately spun off at 2500 rpm for 30 sec. The completed disk was then horizontally cured for 6 hrs. at 125° C. in a convention oven.

C. Recording of the DEM/DES

The above-described optical disk was found to be capable of satisfactory operation as a EFM-recordable DEM on a compact-disk argon-ion laser beam recorder. As used herein, the term "EFM" refers to the digital modulation code used in compact-disc recordings.

EXAMPLE 2

In this example, all mixing and storage were carried out at room temperature in an inert atmosphere of nitrogen in order to minimize any chemical or physical alteration of the components.

A. Expansion Layer

| | phr (by Wt.) |
|---|---|
| Resin Solution (100 phr Morton Thiokol Solithane[1] 113, 2.0 phr SQS Dye* and 180 phr 9:1 Methyl Isobutyl Ketone/Nitromethane) | 282.0 |
| Surfactant Solution (1 phr 3M Fluorad FC-430[2] dissolved in 9 phr Methyl Isobutyl Ketone/Nitromethane) | 0.50 |
| Hardener Solution (13.2 phr Triisopropanolamine, 7.3 phr Moroton Thiokol C113-300[3] and 20 phr 9:1 Methyl Isobutyl Ketone/Nitromethane) | 40.5 |

The surfactant and hardener solutions were added in succession to the resin solution to give the expansion layer solution. Once the hardener solution is added, the time for filtering and coating should not exceed 2 hours. The expansion layer solution was filtered three times through a 47 mm 0.2 micron Teflon[6] filtration unit composed of type 316 stainless steel components. The expansion layer solution (4 ml) was then applied to a clean polycarbonate substrate spinning at 400 rpm over 5.6 sec. The polycarbonate substrate was then held at zero speed for 5 sec to allow leveling to occur before final spin-off at 1000 rpm for 30 sec. This layer was then vertically cured for 16 hr. at 100° C. in a convection oven.

B. Retention Layer

| | phr (by Wt.) |
|---|---|
| Resin Solution (100 phr Dow Chemical DEN-444[4] dissolved in 800 phr 3:1 cyclohexanone/ | 900 |

-continued

| | phr (by Wt.) |
|---|---|
| nitromethane) | |
| Trimellitic Anhydride (TMA) | 30 |
| Savinyl Scarlet RLS[5] | 60 |
| EtTAP* | 0.5 |

*EtTAP is 1,1,5,5-tetrakis(p-diethylaminophenyl)-2,4-pentadienlol trifluoromethanesulfonate TMA, Savinyl Scarlet RLS, and EtTAP were successively dissolved in the resin solution to give the retention layer solution. (The retention layer solution was filtered and coated within a 48 hr. time period after preparation.) The retention layer solution was then successively filtered through a Pall Ultiper DFA 0.2 micron absolute Teflon[6] filter at 5 psi and two 0.2 micron 47 mm millipore filters at 5–10 psi nitrogen. The retention layer solution (4 ml) was then applied to the expansion layer coated disk at 400 rpm over 2.6 sec. The disk was then immediately spun-off at 2500 rpm for 30 sec. The completed disk was then horizontally cured for 6 hr. at 125° C. in a convection oven.

C. Recording of the DEM/DES

The above-described optical disk was found to be capable of satisfactory operation as a EFM-recordable DEM on a compact-disk diode laser-beam recorder. As used herein, the term "EFM" refers to the digital modulation code used in compact-disc recording.

The performance characteristics of the above-described disk are given in Table 1 below. Of particular interest is the fact that the disk was found to be capable of satisfactory operation at a signal-to-noise ratio (CNR) of 62 dB.

TABLE 1

Dye-Polymer Disk Performance

Recording parameters:
na = numerical aperture
Writing:
Wavelength - 828 nm at NA 0.55
Optical power 4 mW
Writing signal:
540 kHz (duty cycle 0.5) tone modulated between 0 mW and nominal writing power.
The linear recording speed was 1.4 m/s.
Read-out characteristics of written signal:
The marks which are formed consist of bumps of well defined height, width and length. The standard deviation of the mark jitter during read out is typically below 8 ns.
Reading:
Wavelength - 633 nm at NA = 0.55
Optical power 0.75 mW
Modulation depth (see footnote): 0.55
Carrier-to-noise ratio in 10 kHz BW: 62 dB
Wavelength - 780 nm at NA = 0.48
Optical power 0.5 mW
Modulation depth (see footnote): 0.60
Carrier-to-noise ratio in 10 kHz BW: 62 dB Footnote: Modulation depth is defined as peak-to-peak amplitude of read-out signal divided by the DC laser reflection signal when no marks are present.

EXAMPLE 3

Embossing Process to Replicate Using the DEM/DES

A. Preparation of the Embossable Photopolymer Pre-replica

The disk substrate, which serves as a dust defocusing layer and provides mechanical support, was a 1.2 mm thick, 120–130 mm diameter injection/compression-molded blank polycarbonate disk with a 15 mm cylindrical center hole.

The embossable information layer was applied to the substrate in the form of a dry film by hot roll lamination. The dry film photopolymer element was prepared by machine coating the photopolymerizable composition below onto 0.0005 inch (12.7 micron) polyethylene terephthalate film; 0.001 inch (25.4 micron) polyethylene film was used as a temporary interleaf.

| Ingredient | Amount (g) |
|---|---|
| Diacrylate ester of bisphenol A epoxy resin derived from bisphenol A and epichlorohydrin viscosity (25° C.) ≐ 1,000,000 cps | 18.48 |
| Trimethylolpropanetrimethacrylate | 13.66 |
| Optical brightener[1] | 2.06 |
| 2-Mercaptobenzoxazole | 0.83 |
| 2,2'-Bis-(o-chlorophenyl)-4,4',5,5'-tetraphenylbiimidazole | 1.71 |
| Trimethylolpropane | 5.08 |
| Glycerol triacetate | 6.75 |
| Methoxyhydroquinone | 0.022 |
| Thermal inhibitor[2] | 0.05 |
| Diethylhydroxylamine | 0.09 |
| Ethyl acrylate (57%)/methylmethacrylate (39%) acrylic acid (4%) terepolymer MW = 192,000; Acid No. = 57; Tg = 33° C. | 18.06 |
| Ethyl acrylate copolymer Acid No. = 63; Tg = −14° C.; viscosity (25° C.) = 2,000 cps; MW = 7,000 | 5.40 |
| Ethyl acrylate (17%)/methylmethacrylate-(71%)/acrylic acid (12%) terpolymer MW = 200,000; Acid No. = 100; Tg = 80° C. | 25.15 |
| Polycaprolactone MW = 15,000; M.P. = CO° C.; Tg = CO° C. | 0.20 |
| Zinc acetylacetonate (2.45 grams) dissolved in 37.0 grams of methanol | 39.45 |

[1]7-(4'-chloro-6-diethylamino-1',3',5'-triazine-4'-yl)amino-3-phenyl coumarin
[2]1,4,4-trimethyl-2,3-iazobicyclo-(3.2.2)-non-2-ene-2,3-dioxide B. Embossing of the Photopolymer Pre-Replica To support the disk during lamination, it was placed on a temporary carrier sheet of commercial color proofing receptor (Cromalin ® Masterproof Commercial Receptor, Product No. CM/CR, E. I. du Pont de Nemours & Co., Inc., Wilmington, Del.). The dry film was laminated to the substrate using a Cromalin ® laminator (Du Pont, Wilmington, Del.) operating at a roll surface temperature of 115° to 124° C. Lamination covered the disk surface uniformly and sealed it around the edges to the carrier sheet; the disk was cut out with a razor blade and the laminated film cut away from the center hole.

Information was transferred to the laminated disk by embossing the dry film layer with the above prepared direct effect master/stamper. Lands and peaks on the stamper were 0.9 to 3.3 microns long, approximately 0.1 micron high and 0.6 micron wide. The polyester cover sheet was removed from the laminated disk. To center the stamper, a centering pin was first inserted into the disk center hole. The stamper was then concentrically fitted to the disk using the same pin. A sandwich was made by laminating the stamper onto the information layer through a roll laminator operating at room temperature. The tacky photopolymerizable layer held the stamper in place and the centering pin was removed. The sandwich was then placed between 6"×6" square 1.2 mm polycarbonate sheets to protect the sandwich from the press platens. The sandwich was loaded at room temperature into a 40,000 lb. (18.1 metric ton) capacity hydraulic platen press with 20.3×20.3 cm die space, 102 mm diameter ram and manual lever action (Pasadena Hydraulics, Inc., City of Industry, Calif.). The load was quickly increased to full capacity, corresponding to a pressure of 500–2,000 lbs./in² (35–141 kg/cm²) based on about 20 sq. in. (129 cm²) sandwich area. The load was released after 2–3 sec dwell time and the assembly removed from the press.

The embossed information was then hardened and the embossing made permanent by ultraviolet radiation exposure. The stamper substrate sandwich, with the transparent substrate facing toward the source, was placed in a high intensity ultraviolet exposure unit (5 kilowatt Douthitt V10LVX metal halide light system). After a 10–120 second exposure, the stamper was removed by flexing the assembly slightly. By means of a microscope, the embossed surface was inspected. It was clear that stamper information had been transferred to the photopolymer layer with good fidelity.

The hardened information layer was metallized by sputtering 800–1000 Å of aluminum using standard procedures known in the art. After metallization, the disk was played on an audio compact disk player, whereupon it reproduced sound equivalent to commercial injection/compression molded disks.

To protect the surface, a dry film lamination process was used. Commercial Cromalin negative colorproofing film (product code C4/CN, E. I. du Pont de Nemours & Co., Wilmington, Del.) was applied using a carrier sheet and hot roll lamination as described above except for use of a roll temperature of 99° to 107° C. The laminated film was then uniformly exposed to ultraviolet light for 30 seconds using the equipment described above.

EXAMPLE 4

Embossing Process to Replicate Using a Pre-Metallized Reflector on the Embossable Photopolymer Pre-Replica A. Preparation of the Pre-Metallized Pre-replica The disk substrate was a 1.2 mm thick, 120 mm diameter injection molded blank or flat polycarbonate disk with a 15 mm i.d. center hole.

The substrate was first coated with a barrier layer to prevent mobile embossable layer components from migrating into the substrate during storage before embossing. The photopolymerizable composition below was spin coated (1000 rpm, 25 sec, dried (50° C., 25 min) and UV cured (3 J/cm²) to give a ~2.5 μm±thick coating.

Subsequently the embossable layer was spin coated (1000 rpm, 25 sec) and dried (50° C., 30 min) to give a 4.0 μm±thick coating.

| Component | Wt. % |
|---|---|
| Barrier Layer | |
| Elvacite 2010 (PMMA) | 9.46 |
| Trimethylolpropane Trimethacrylate | 3.87 |
| Novacure 3704 (Bisphenol A Epoxy Diacrylate) | 5.25 |
| Benzophenone | 1.13 |
| Michler's Ketone | 0.08 |
| Fluorad FC-430 Surfactant | 0.19 |
| Diacetonealcohol | 40.0 |
| Methylisobutylketone | 40.0 |
| Information Layer | |
| Elvacite 2010 (PMMA) | 9.46 |
| Trimethylolpropane Trimethacrylate | 3.87 |
| Novacure 3704 (Bisphenol A Epoxy Diacrylate) | 5.25 |
| Benzophenone | 1.13 |
| Michler's Ketone | 0.08 |
| Fluorad FC-430 Surfactant | 0.19 |

| Component | Wt. % |
|---|---|
| -continued | |
| Methylethylketone | 80.0 |

B. Embossing of the Pre-metallized Pre-replica

Information was transferred to the pre-replica disk by embossing with the above prepared direct effect stamper (DES) in Example 2. The DES was mounted on the upper platen of a hydraulic press fitted with a centering pin. The metallized pre-replica was centered over a centering hole in a 3" thick polished quartz plate mounted on the bottom platen. The press was slowly closed bringing the two disks into contact and the load was then quickly brought to 1600 psi. An external UV exposure source was used to harden the embossable layer in situ through a hole drilled into the bottom platen. Total exposure was 1–4 J/cm².

The press platens were separated and the replica disk could then be played directly on a commercial CD player.

GLOSSARY

[1] Solithane is a tradename of Morton Thiokol, Inc., Chicago, Ill. for urethane prepolymer.

[2] Fluorad FC-430 is a tradename of the 3M Corp., St. Paul, Minn. for hydroxylated alkyl sulfonamide.

[3] C113-300 is a trade designation of Morton Thiokol, Inc., Chicago, Ill. for triglycol polyester curing agent.

[4] DEN-444 is a tradename of Dow Chemical Co., Midland, Mich. for epoxy prepolymer.

[5] Sandoz Chemical Co., Charlotte, N.C.

[6] Teflon ® is a registered trademark of E. I. duPont de Nemours and Co., Wilmington, Del. for fluorocarbon resins.

We claim:

1. A method for making an optical recording medium having a basic structure of (a) an optically transparent, dimensionally stable substrate, (b) a solid polymeric informating layer having optically readable information embossed therein, and (c) a light-reflective layer overlying the information layer comprising the steps of:

A. Forming an information master recording which is directly usable as a stamper (master/stamper) by writing a relief track of optically readable information in the form of a series of solid bumps by action of a laser beam upon a recording medium comprising (1) a dimensionally stable planar substrate having adhered to a surface thereof, (2) an active recording layer comprising (a) a lower polymeric expansion layer adhered directly to a surface of the substrate, the expansion layer having a low thermal conductivity, high thermal coefficient of expansion (TCE) and $T_g$ below 50° C., and having a colorant dispersed therein; and (b) bonded to the expansion layer an upper retention layer comprising a solid non-elastic polymer having low thermal conductivity, low TCE and $T_g$ above 70° C.;

B. Forming a hardenable soft polymeric layer on one side of a dimensionally stable planar optically transparent substrate, the layer having a creep viscosity of at least 20 megapoise and a thickness of at least 0.1 micron;

C. Optionally forming a reflective layer on the exposed surface of the hardenable polymeric layer prior to following embossing step D;

D. Embossing the hardenable polymeric layer with an image of the relief information track by applying the bump-containing surface of the master/stamper to the hardenable layer under pressure;

E. Hardening the hardenable polymeric layer;

F. Separating the master/stamper from the embossed polymeric layer; and

G. Forming a reflective layer on the embossed surface of the hardened polymeric layer if none was formed prior to embossing step D.

2. The method of claim 1 in which the hardenable polymeric layer is photohardenable and is hardened in step E by passing actinic radiation through the transparent substrate and the hardenable polymeric layer.

3. The method of claim 1 in which the reflective layer is formed on the hardenable polymeric layer prior to embossing step D.

4. The method of claim 1 in which the reflective layer is formed on the hardened polymeric layer subsequent to separating the master/stamper from the embossed and hardened polymeric layer.

5. The method of claim 1 in which the reflective layer is a metal.

6. The method of claim 5 in which the reflective layer metal is selected from the group consisting of aluminum, copper, gold, silver, and alloys of these metals.

7. The method of claim 1 in which the master/stamper is maintained in contact with the embossed surface of the hardenable polymeric layer and in step F is separated from the hardened polymeric layer.

8. The method of claim 1 in step F of which the master/stamper is separated from the embossed photohardenable polymeric layer prior to hardening in step E.

9. The method of claim 1 in which the master/stamper is maintained in contact with the embossed surface of the hardenable polymeric layer without the application of pressure.

10. The method of claim 1 in which the pressure on the master/stamper is removed after embossing step D but before hardening step E.

11. The method of claim 1 wherein the substrate is a disk.

12. The method of claim 1 in which the hardenable polymeric layer is formed on the substrate by coating thereon a liquid solution of the hardenable polymer and removing the solvent therefrom.

13. The method of claim 9 in which the hardenable polymeric layer is applied by spin coating.

14. The method of claim 1 in which the hardenable polymeric layer is applied by laminating on said substrate a preformed solid layer of hardenable polymer.

15. The method of claim 1 in which a protective coating is applied to the reflective layer after embossing.

16. The method of claim 1 in which the master/stamper has a thin release layer applied to the information layer thereof.

17. The method of claim 1 in which the hardenable polymeric layer is hardened by the application of heat.

18. The method of claim 1 in which steps B through G are repeated for making a plurality of optical recording media.

19. The method of claim 1 in which the $T_g$ of the lower polymer expansion layer is below 50°–60° C.

20. The method of claim 5 in which the metal reflective layer is applied to the hardenable polymer layer prior to embossing step D by DC-magnetron sputtering.

21. The method of claim 5 in which the metal reflective layer is applied to the hardenable polymer layer prior to embossing step D by resistance evaporation.

22. The method of claim 5 in which the metal reflective layer is applied to the hardened polymer layer subsequent to embossing step D by DC-magnetron sputtering.

23. The method of claim 5 in which the metal reflective layer is applied to the hardened polymer layer subsequent to embossing step D by resistance evaporation.

24. The method of any one of claims 20–23 in which the reflective layer is formed from metallic silver.

* * * * *

UNITED STATES PATENT AND TRADEMARK OFFICE
CERTIFICATE OF CORRECTION

PATENT NO. : 5,188,863
DATED : February 23, 1993
INVENTOR(S) : de Graaf, Fickes, Johnson and Simmons It is certified that error appears in the above-indentified patent and that said Letters Patent is hereby corrected as shown below:

Column 26, line 42, change "informating" to --information--.

Signed and Sealed this

Tenth Day of May, 1994

Attest:

BRUCE LEHMAN

Attesting Officer

Commissioner of Patents and Trademarks